United States Patent [19]

Allemand et al.

[11] Patent Number: 4,510,394

[45] Date of Patent: Apr. 9, 1985

[54] MATERIAL FOR SCINTILLATORS

[75] Inventors: Robert Allemand, Saint Ismier; Michel Laval, Grenoble, both of France

[73] Assignee: Commissariat a l'Energie Atomique, Paris, France

[21] Appl. No.: 388,992

[22] Filed: Jun. 16, 1982

[30] Foreign Application Priority Data

Jun. 23, 1981 [FR] France .................................. 81.12314

[51] Int. Cl.³ ........................ G01J 1/58; G01N 21/64
[52] U.S. Cl. ............................... 250/483.1; 250/361 R
[58] Field of Search ............ 250/483.1, 487.1, 361 R, 250/363 S

[56] References Cited

U.S. PATENT DOCUMENTS 4,110,080 8/1978 Pastor ........................ 156/DIG. 89
4,398,092 8/1983 Carlson ........................... 250/361 R

OTHER PUBLICATIONS

Journal of Nuclear Medicine, vol. 21, No. 2, Feb. 1980, "Potential Advantages of a Cesium Fluoride Scintillator for a Time-of-Flight Positron Camera", R. Allemand et al., pp. 153-154.

IEEE Nuclear Science, vol. NS-18, 1971, M. R. Farukhi et al.; "Varium Fluoride as a Gamma Ray and Charged Particle Detector", pp. 200-204.

Primary Examiner—Bruce C. Anderson
Attorney, Agent, or Firm—Oblon, Fisher, Spivak, McClelland & Maier

[57] ABSTRACT

Material for scintillators, application to the construction of very fast, high energy photon detectors and to the construction of tomographs.

The material for scintillators is constituted by barium fluoride which, under excitation, is subject to light emission having a slow component with a maximum centered on 3200 Å and a fast component with a maximum centered on 2250 Å, the barium fluoride being purified so as to reduce the defects of its crystal lattice, in order to reinforce the intensity of the fast component of its light emission.

5 Claims, 2 Drawing Figures

MATERIAL FOR SCINTILLATORS

BACKGROUND OF THE INVENTION

The present invention relates to a material for scintillators. It more particularly applies to the construction of very fast detectors of high energy photons, i.e. X or gamma photons and to the construction of tomographs.

It is known that one of the most accurate means for detecting the passage time of a photon involves the use of a plastic scintillator associated with a fast photomultiplier. There are a number of commercially available plastic scintillators, e.g. those known under the names PILOT U or NE 111. During their deexcitation in accordance with an interaction with a gamma photon, all these plastic scintillators emit a light pulse having a time constant of approximately 1.5 ns and whose intensity, i.e. the total number of photons of said pulse is proportional to the energy of the incident $\gamma$ photon. A light output of approximately 3000 to 4000 photons/MeV is normally obtained with such scintillators.

The device diagrammatically shown in FIG. 1 can be used for evaluating the time or time measurement performances of plastic scintillators, i.e. their transit time measurement performances, as well as for comparing these scintillators with other scintillators.

This device comprises two facing detectors $D_1$ and $D_2$, respectively incorporating thin plastic scintillators 2a and 2b associated with fast photomultipliers 3a, 3b. The latter are electrically connected respectively to high voltage power supplies 4a, 4b, while both are electrically connected to electronic amplification, selection and counting means, known to the Expert, and which also makes it possible to measure the time difference between the detection time of a $\gamma$ photon by the first detector $D_1$ and the detection time of another $\gamma$ photon by the second detector $D_2$, said two $\gamma$ photons, each having an energy of 511 keV, resulting from the annihilation of an electron and a positron and being simultaneously emitted in opposite directions from a point 6 of an object 1 in which a positron-emitting substance has been incorporated.

The results obtained for these time differences fluctuate and have a Gaussian distribution which is characteristic of the type of scintillator used for a given measuring cascade (photomultipliers 3a, 3b and electronic means 5). This distribution is itself characterized by its total mid-height width or FWHM.

In the case of plastic scintillators with a diameter of 20 mm and a thickness of 2 mm, the FWHM is approximately 150 ps, with an energy threshold such that only events resulting from photoelectric effects are selected, and approximately 200 ps by taking 90% of the detected events and with an energy threshold equal to or above 100 keV.

The main disadvantage of a plastic scintillator is that the plastic material from which it is formed is on the one hand constituted by elements whose atomic numbers are low and on the other hand also has a low density (approximately 1.1 to 1.2 g/cm$^3$), due to the fact that it is formed from light atoms. Thus, the main effect governing the interactions of the $\gamma$ photons with said plastic material is the Compton effect. Consequently, there is no simple relationship between the energy of an incident $\gamma$ photon and the energy yielded by the latter to the plastic scintillator, so that any spectrometry of the $\gamma$ radiation is then impossible. It is therefore necessary either to lose a large number of interactions by not taking account of the rare $\gamma$ photons interacting by the photoelectric effect, or to analyse all the photons which have interacted without being able to select them as a function of their energy.

Another very accurate prior art means for detecting the passage time of a photon and which is more particularly described in French Patent Application No. 79 02053 involves the use of a scintillator made from cesium fluoride CsF, said material containing on the one hand cesium atoms, said element having a high atomic number (55), whilst on the other hand having a high density (approximately 4.6 g/cm$^3$). However, it is inferior to plastic in two respects, namely its fluorescence time constant is approximately 2.5 to 3 ns (instead of approximately 1.5 ns for plastic) and its scintillation response is approximately 1500 to 2000 photons/MeV (instead of 3000 to 4000 photons/MeV for plastic). However, cesium fluoride makes it possible to carry out spectrometry with an interesting energy level, because its resolution is approximately 30% with $\gamma$ photons of 511 keV. Moreover, by replacing plastic scintillators 2a and 2b of the device of FIG. 1 by cesium fluoride scintillators with the same geometry, it is possible to obtain a FWHM of approximately 200 to 300 ps, as a function of the cesium fluoride quality used.

Thus, the time performances of a plastic scintillator are better than those of a cesium fluoride scintillator. However, if account is taken of the fact that the stopping power of cesium fluoride is higher than that of plastic, it can be affirmed that in the prior art and based on an equal detection efficiency, cesium fluoride gives better time results than plastic.

However, compared with plastic, cesium fluoride has a disadvantage in that the material is very difficult to obtain as a result of its very high hygroscopy, which is well above that of e.g. thallium-doped sodium iodide NaI(Tl). This makes it necessary to very tightly encapsulate this material to permit its use for the production of scintillators. Therefore, cesium fluoride scintillators are very expensive and far from easy to use.

BRIEF SUMMARY OF THE INVENTION

The problem of the invention is to obviate these disadvantages.

It therefore relates to a material for scintillators formed from barium fluoride, wherein under excitation the barium fluoride is subject to light emission having a slow component having a maximum centered on 3200 Å and a fast component having a maximum centered on 2250 Å, the barium fluoride being purified so as to reduce the defects of its crystal lattice and reinforce the intensity of the fast component.

For example, the invention applies to the construction of very fast, high energy photon detectors namely X or $\gamma$ photons, particularly for those used for carrying out transit time measurements. It is also applicable to the construction of tomographs, particularly positron tomographs and more specifically to the construction of transit time, positron tomographs.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
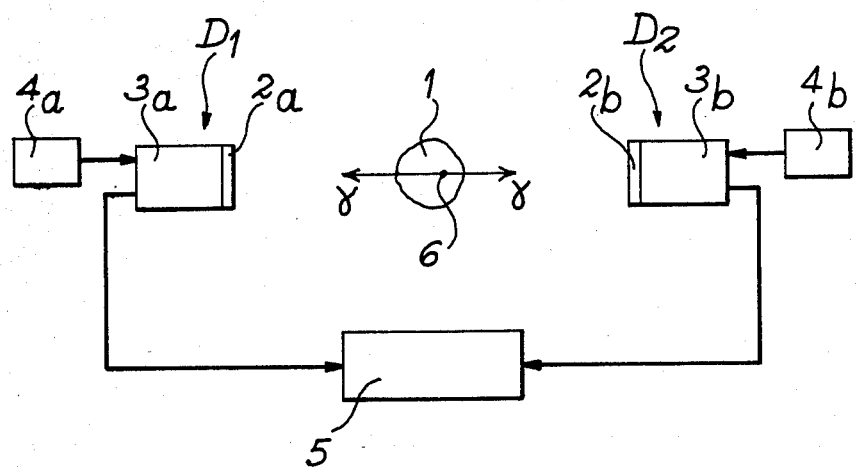
FIG. 1 a diagrammatic view of a device making it possible to evaluate the time performances of scintillators and which has already been described.

A barium fluoride ($BaF_2$) scintillator has time performance levels very similar to those of a plastic scintillator and has even more marked advantages compared with a cesium fluoride scintillator, whilst retaining the simplicity of use and the low cost of the plastic scintillators. Thus, the atomic number of barium (56) is slightly higher than that of cesium (55), which also applies regarding the density of barium fluoride (4.88 g/cm$^3$) compared with that of cesium fluoride (4.61 g/cm$^3$). The barium fluoride stopping power with respect to X or $\gamma$ photons is consequently higher than that of cesium fluoride. Moreover, barium fluoride is substantially insensitive to water, as well as to numerous organic solvents such as ethanol, ethyl ether, acetone and methanol. In addition, it can be easily machined or worked, e.g. compared with glass which is harder, but it is still not fragile. Finally, when using the device of FIG. 1 in which the plastic scintillators 2a and 2b are replaced by barium fluoride scintillators with the same geometry, with respect to the time performances of barium fluoride, responses are obtained with a FWHM of approximately 200 ps.

These values are explained by the scintillation characteristics of barium fluoride. The emission of this material has a fast component, whose time constant is approximately 0.8 ns, with a light output of approximaterial 1000 photons/MeV, as well as a slow component, whose time constant is approximately 600 ms, with a light output of 3000 to 4000 photons/MeV. The fast component is obviously usable in a device performing transit time measurements in order to obtain a good time precision. The energy resolution of barium fluoride can be utilized in the same way as that of cesium fluoride with identical or better results, depending on the way in which the barium fluoride is used. An energy analysis can be performed synchronously with the time analysis, whilst only taking account of the 1000 photons/MeV of the fast component, which leads to a 30% energy resolution with photons of e.g. 511 keV, said resolution being identical to that obtained with cesium fluoride. It is also possible to delay the energy analysis waiting until the complete light emission is ended and specifically for 1.5 to 2 $\mu$s, followed by the validation of the analysed event, whilst retaining the result of the time analysis for a few microseconds in an analog or digital device of a suitable type. In this case, the energy resolution for 511 keV photons is approximately 13% which can be highly advantageous for certain applications, like positron tomography, where the presence of diffused radiation is highly prejudicial.

The existence of said slow and fast components and the values of the time constants associated therewith, as well as the measurements of the emission spectra of the barium fluoride scintillators show that the slow component is caused by defects in the crystal lattice of $BaF_2$, namely chemical impurities included in the lattice or a poor arrangement of the barium and fluorine atoms. These defects introduce intermediate levels into the forbidden band of the barium fluoride and these have the effect of producing an emission with a wavelength higher than that associated with the fast component and having a high time constant (0.6 $\mu$s). Studies have shown that the said fast component corresponds to an emission band between 2000 and 2500 Å, having a maximum centered on 2250 Å. The slow component corresponds to wavelengths above 2500 Å and which, as a function of the $BaF_2$ samples, can reach 6000 Å, the intensity of the light emission having a maximum at approximately 3200 Å.

The transparency of $BaF_2$ samples in the wavelength range centered on 2250 Å is perfectly correlated with the emission of the fast component. Thus, the samples having in their transmission spectrum an absorption at 2250 Å have no or little fast component in their emission spectrum. This phenomen is directly related to the height of the absorption peak of the samples, so that the greater the absorption peak (for a constant sample thickness) the fewer the rapidly emitted photons and with the thickness of the sample, so that for a given quality (i.e. for a given impurity level) the greater the thickness, the fewer the rapidly emitted photons.

Thus, the "intrinsic" emission of $BaF_2$ at 2250 Å exists for all the samples of this material, but can be masked by being absorbed by defects of the $BaF_2$ lattice, which convert it into an emission with a higher wavelength by delaying the emission of light.

Thus, an improvement to the barium fluoride purity (elimination of chemical impurities and particularly iron, as well as of structural defects of the lattice, etc, as seen in the process disclosed in U.S. Pat. No. 4,110,080) can make it possible to reinforce the intensity of the fast component compared with the slow component in the light emission of the barium fluoride.

Barium fluoride, purified in this way, can be used for producing scintillators for detectors for use in tomographs, particularly positron tomographs and more specifically transit time, positron tomographs, like that described in French Patent Application No. 79 02053. The latter shows the advantage offered by such transit time, positron tomographs as compared with conventional positron tomographs, based on the reduction of the "back projection" length or distance and consequently reducing the noise contained in the reconstructed images for a same number of detected events. This advantage is also apparent from a comparison of the number of detected events, making it possible to obtain an image of the same quality with a transit time, positron tomograph and with a conventional positron tomograph.

Figure 2:
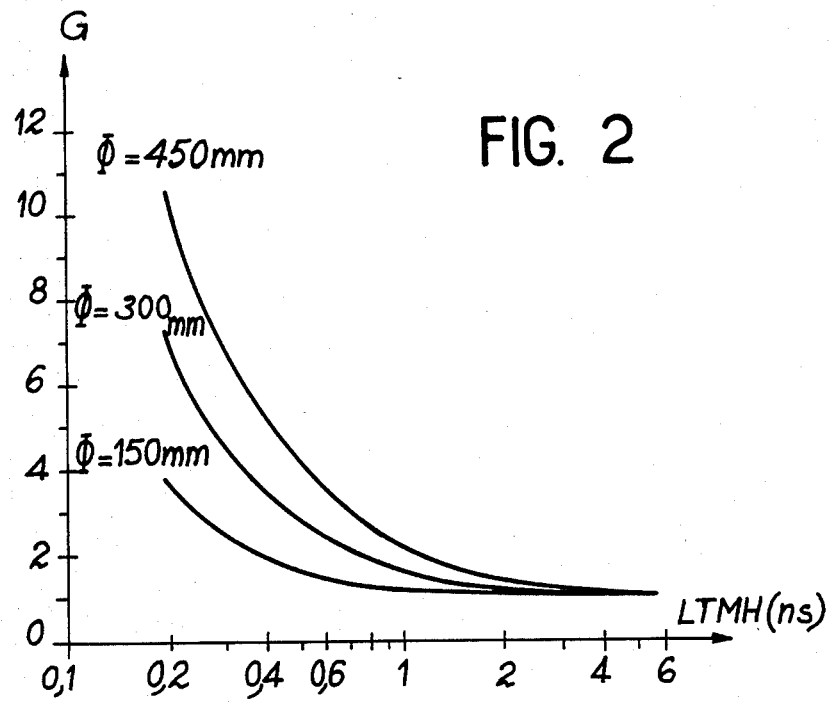
FIG. 2 a graph showing the gain variations (expressed by a ratio of numbers of events measured) provided by a transit time, positron tomograph, like that described in French Patent Application No. 79 02053 when compared with a conventional positron tomograph, as a function of the FWHM of the response of the measuring cascade of such tomographs to a positron point source for different diameters of phantoms with a uniform distribution of the positron-emitting substance.

The curves of FIG. 2 give the gain variations G (expressed by the ratio of numbers of events detected) provided by a transit time, positron tomograph, as a function of the FWHM (expressed in ms) of the response of the measuring cascade of the positron point source transit time, for different diameters $\phi$ of phantoms having a uniform distribution of positron-emitting substance. These curves illustrate the importance of the improvement of the FWHM, i.e. the latter is reduced. Thus, the lower the FWHM, the higher the aforementioned gain and consequently the lower the quantity of tracer which has to be injected into a patient to be examined with a transit time, positron tomograph compared with that which would have to be injected if the patient was examined with a conventional positron tomograph. The use of a barium fluoride scintillator, purified in the manner indicated hereinbefore, makes it possible to have a FWHM, i.e. an error in the transit time measurements, which is at least 1.3 times lower than that obtained by using a cesium fluoride scintillator for scintillators of the same geometry.

Apart from this time advantage, barium fluoride has a slightly higher attenuation coefficient than that of cesium fluoride, due to the fact that barium has a higher atomic number than cesium and the density of $BaF_2$ is higher than that of $CsF$. This other advantage contributes to increasing the sensitivity of a transit time, positron tomograph by 5 to 10%. Moreover and as has been indicated hereinbefore, barium fluoride has no affinity for water, which is not the case with cesium fluoride which must be hermetically encapsulated in order to permit the production of scintillators, which are therefore costly and difficult to use. The fact that the new material for scintillators, i.e. barium fluoride does not require encapsulation makes it possible to significantly reduce the surface lost between the scintillators and leads to a supplementary sensitivity gain of approximately 15% for a transit time, positron tomograph.

Thus, barium fluoride purified in the manner indicated hereinbefore is superior to cesium fluoride with regards to its time performances, detection efficiency, ease of use and the production costs of the resulting scintillator. When used in the production of detectors for transit time, positron tomographs, it makes it possible to reduce the quantity of tracer to be injected into a patient to be examined by a factor at least equal to 1.5 compared with that necessary with tomographs of the same type using detectors produced with cesium fluoride for the same quality of the images.

What is claimed is:

1. A very fast scintillator for the detection of high energy photons, said scintillator being comprised of barium fluoride material, said material being transmissive to light at least in the wavelength range of 2000 Å to 2500 Å, said material being excited by said high energy photons to emit a first component and a second component of light, said first component being a slow component and having a wavelength above 2500 Å, said second component being a fast component in the wavelength range of 2000 Å to 2500 Å with a time constant of 0.8 ns.

2. A scintillator according to claim 1 wherein said scintillator is used for photon transit time measurements.

3. A scintillator according to claim 1 wherein said scintillator is used for the production of tomographs.

4. An scintillator according to claim 3, wherein the tomographs are positron tomographs.

5. An scintillator according to claim 4, wherein the tomographs are also transit time tomographs.

* * * * *